(12) United States Patent
De France et al.

(10) Patent No.: US 9,836,356 B2
(45) Date of Patent: Dec. 5, 2017

(54) DATA BACKUP METHOD AND DEVICE

(71) Applicant: THOMSON LICENSING, Issy de Moulineaux (FR)

(72) Inventors: Serge De France, Rennes (FR); Nicolas Le Scouarnec, Liffré (FR); Gilles Straub, Acigne (FR)

(73) Assignee: Thomson Licensing, Issy-les-Moulineaux (FR)

( * ) Notice: Subject to any disclaimer, the term of this patent is extended or adjusted under 35 U.S.C. 154(b) by 424 days.

(21) Appl. No.: 14/410,092

(22) PCT Filed: Jun. 19, 2013

(86) PCT No.: PCT/EP2013/062756
§ 371 (c)(1),
(2) Date: Dec. 21, 2014

(87) PCT Pub. No.: WO2013/189990
PCT Pub. Date: Dec. 27, 2013

(65) Prior Publication Data
US 2015/0347235 A1 Dec. 3, 2015

(30) Foreign Application Priority Data

Jun. 21, 2012 (EP) .................................... 12305705

(51) Int. Cl.
*G06F 17/30* (2006.01)
*G06F 11/14* (2006.01)
*H04L 29/08* (2006.01)

(52) U.S. Cl.
CPC ...... *G06F 11/1451* (2013.01); *G06F 11/1464* (2013.01); *G06F 17/30073* (2013.01); *H04L 67/06* (2013.01); *H04L 67/1097* (2013.01); *H04L 67/28* (2013.01); *H04L 67/2857* (2013.01); *H04L 67/32* (2013.01); *G06F 2201/80* (2013.01)

(58) Field of Classification Search
CPC .................................................... G06F 11/1469
USPC .................................................... 707/645, 162
See application file for complete search history.

(56) References Cited

U.S. PATENT DOCUMENTS

| 5,673,381 | A | 9/1997 | Huai et al. |
| 7,334,006 | B1 | 2/2008 | Cabrera |

(Continued)

FOREIGN PATENT DOCUMENTS

| CN | 101902498 | 12/2010 |
| WO | WO2008154784 | 12/2008 |
| WO | WO2011154375 | 12/2011 |

OTHER PUBLICATIONS

Defrance etal: "Efficient peer to peer backup services through buffering at the edge", Proceedings of the 2011 IEEE International Conference on Peer-to-Peer Computing (P2P 2011), 142-151, Aug. 31-Sep. 2, 2011.

(Continued)

*Primary Examiner* — Baoquoc N To
(74) *Attorney, Agent, or Firm* — Myers Wolin LLC

(57) ABSTRACT

The present invention relates to a reliable method and device for backup of data from a first network to a second network. The method and device of the present invention can for example be used for a backup of voluminous data from the first to the second network via a link with a relatively small bandwidth.

8 Claims, 5 Drawing Sheets

(56) References Cited

U.S. PATENT DOCUMENTS

| | | | |
|---|---|---|---|
| 7,375,003 B2* | 5/2008 | Yoon | H01L 21/76897 257/E21.507 |
| 7,809,691 B1 | 10/2010 | Karmarkar et al. | |
| 8,375,003 B1* | 2/2013 | Afonso | G06F 11/1451 707/639 |
| 9,311,318 B1* | 4/2016 | Afonso | G06F 11/1451 |
| 2002/0015336 A1* | 2/2002 | Watkins | G06F 11/2094 365/200 |
| 2003/0158831 A1 | 8/2003 | Zaremba | |
| 2004/0107381 A1* | 6/2004 | Bomfim | G06F 17/30312 714/4.12 |
| 2004/0205206 A1 | 10/2004 | Naik et al. | |
| 2010/0070725 A1* | 3/2010 | Prahlad | G06F 11/1453 711/162 |
| 2010/0257403 A1 | 10/2010 | Virk et al. | |
| 2011/0153567 A1 | 6/2011 | Sawdon et al. | |
| 2012/0089572 A1* | 4/2012 | Raichstein | G06F 17/3015 707/645 |

OTHER PUBLICATIONS

Da Silva etal: "Performance of a parallel network backup manager", USENIX Association. Proceedings of the Summer 1992 USENIX Conference, 217-225, Jun. 8-12, 1992.
Search Report dated Sep. 10, 2013.

* cited by examiner

DATA BACKUP METHOD AND DEVICE

This application claims the benefit, under 35 U.S.C. §365 of International Application PCT/EP2013/062756, filed Jun. 19, 2013, which was published in accordance with PCT Article 21(2) on Dec. 27, 2013 under number WO2013/189990 in the English language and which claims the benefit of European patent application No. 12305705.1, filed Jun. 21, 2012.

1. FIELD OF INVENTION

The present invention generally relates to digital data storage and access, and more particularly, to backup of voluminous data from a first to a second network.

2. TECHNICAL BACKGROUND

With the widespread deployment of user consumer devices that are interconnected via Internet access gateways, equipped with wired and wireless network interfaces, one can currently speak of home networks. Most devices and appliances in the home network use the home network to communicate with the outside world, via the Internet. The home appliances are connected to equipment commonly referred to as a home gateway. The home gateway is an 'always on' device that not only ensures Internet connection for the home network devices, but also, for example, connectivity for a set of telephone devices for telephony over IP. Often, the home gateway is connected to the Internet via a single ADSL (Asymmetrical Digital Subscriber Line) connection. All devices in the home share thus the same ADSL connection via the gateway device. The ADSL connection offers an asymmetrical bandwidth in terms of upload and download bit rate. Bandwidth available for upload is some factors lower than bandwidth available for download. This asymmetrical bandwidth is generally convenient for the use of the home network devices that tend to have a more important need for download bandwidth than for upload bandwidth.

In the same time, data stored by the home devices tends to increase in volume: photos, movies, documents. Users of the home network feel the need to protect their data. Local backup on a mass storage device is unsatisfying because the data is not secured against accidental failure, theft or fire. Transferring voluminous data to an external storage on the Internet is time-consuming because of the low upload bit rate that additionally needs to be shared with other home network devices. If a full data backup takes several days to upload to the external storage over an ADSL connection, any data loss that occurs in the home network to data that was modified after the full data backup was started and before a next full data backup has been completed is lost, the modified data not being secured against data loss until it in turn is completely transferred as part of a next full backup.

There is thus a need for an improved data transfer method, so that data stored is better secured against data loss, taking into account the bit rate of the upload link, and covering 'intermediate' transfers.

3. SUMMARY OF THE INVENTION

The present invention aims at alleviating some inconveniences of prior art.

Notably, the invention proposes a data backup method, implemented by an intermediate device that connects first devices, connected in a first network, to a backup data storage server connected in a second network. The method comprises a step of first uploading to the backup data storage server, upon expiration of a first predetermined delay, of a full backup archive built by the intermediate device from data stored by the first devices. A full backup archive that is completely uploaded to the backup data storage server replaces a full backup archive that is already stored by the backup data storage server. The method further comprises a step of second uploading to the backup data storage server, during the first uploading and upon expiration of a second predetermined delay that is shorter than the first predetermined delay, of at least one differential backup archive built by the intermediate device from data stored by the first devices. Each of the at least one differential backup archive that is uploaded in the second uploading step is differential with regard to a latest completely uploaded full backup archive that is uploaded during the first uploading step.

According to a variant embodiment of the method according to the invention, the predetermined first delay and the predetermined second delay are determined as a function of a bit rate of an uplink connecting the intermediate device to a storage in the second network and as a function of a size of the at least one full backup archive and of the at least one differential backup archive.

According to a variant embodiment of the method according to the invention an uploaded full backup archive is only deleted from the backup data storage server when a full backup archive with a newer version is completely uploaded to the storage.

According to a variant embodiment of the method according to the invention the first network is a local area network and the second network is the Internet.

According to a variant embodiment of the method according to the invention the intermediate device is a gateway giving the first devices in the first network access to the second network.

The invention also relates to a device for backup of data stored by first devices connected in a first network to a backup data storage server connected in a second network, comprising an archiving module for building of a full backup archive from data stored by the first devices and for building of at least one differential backup archive from data stored by the first devices. The device for backup further comprises a timing module for determining of expiration of a first predetermined delay and of a second predetermined delay, the second predetermined delay being shorter than the first predetermined delay, and a first network interface for first uploading to the backup data storage server, upon expiration of the first predetermined delay, of a full backup archive, wherein a full backup archive that is completely uploaded to the backup data storage server replaces a full backup archive that is already stored by the backup data storage server. The first network interface also uploading to the backup data storage server, during the first uploading and upon expiration of the second predetermined delay, at least one differential backup archive, wherein each of the at least one differential backup archive that is uploaded is differential with regard to a latest completely uploaded full backup archive that is uploaded during the first uploading.

4. LIST OF FIGURES

More advantages of the invention will appear through the description of particular, non-restricting embodiments of the invention. The embodiments will be described with reference to the following figures.

5. DETAILED DESCRIPTION OF THE INVENTION

Figure 1:
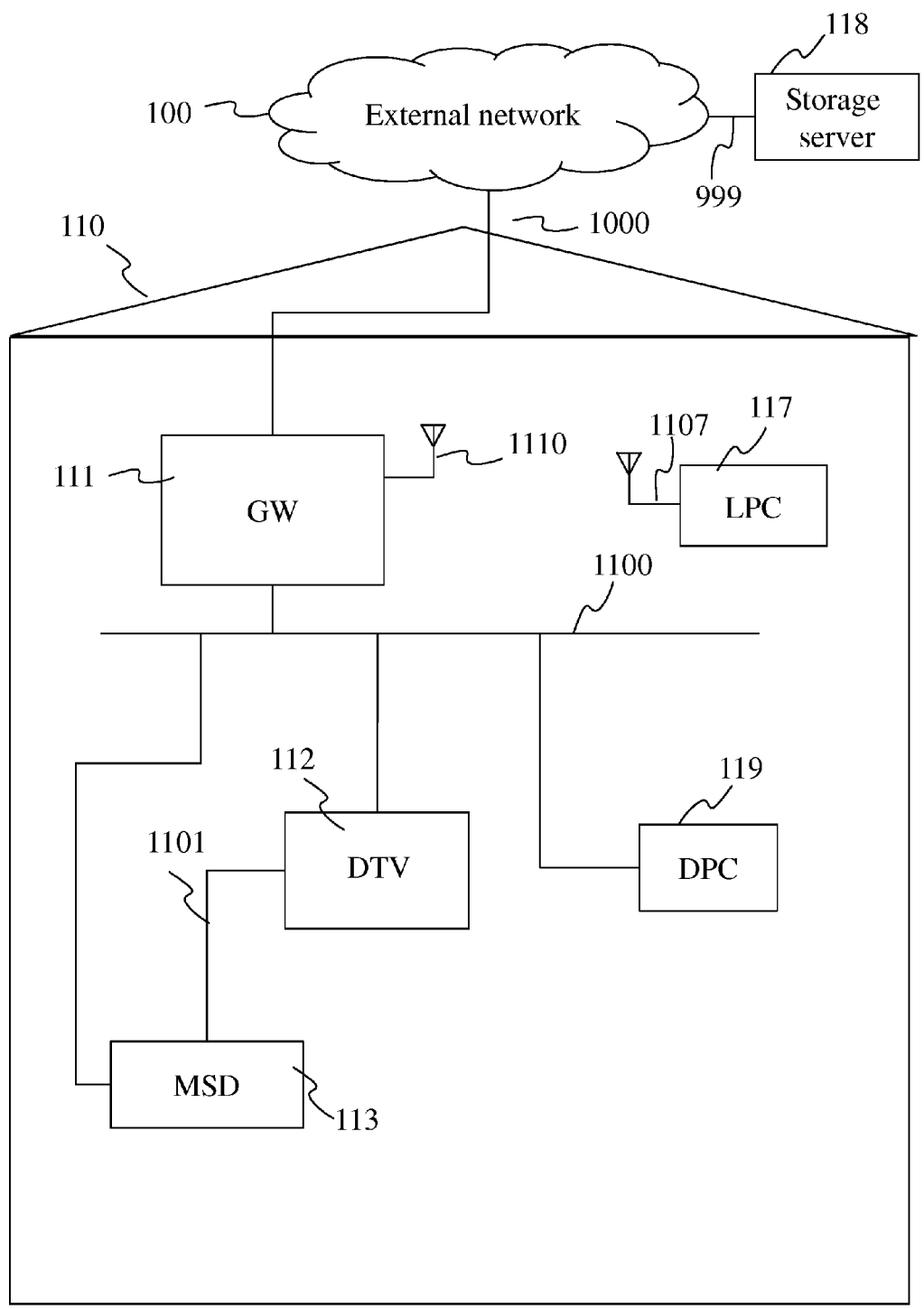
FIG. 1 shows a typical prior-art home network environment where the invention can be implemented.

FIG. 1 shows an example of a typical local network where the invention can be implemented. A local network 1100 is present in user premises 110. An ADSL (Asymmetric Digital Subscriber Line) 1000 connects the user premises to an external network 100 such as the Internet that among others provides a storage server 118 for distant storage of data detained in the local network. The local network comprises a wired network (1100) and a wireless network (1110, 1107), and comprises the following devices:
- a gateway (GW for GateWay) 111;
- a multi-media hard disc device 113 (MSD) for recording and playing of movies, photos, etc;
- a digital television 112 (DTV for Digital TeleVision) set with Internet connectivity;
- a laptop personal computer 117 (LPC);
- a desktop personal computer 119 (DPC);

These devices are interconnected with several types of connections:
- wired Ethernet connection 1100 connecting MSD 113, DTV 112 and DPC 119 to GW 111;
- wireless connection 1110, 1107, connecting LPC 117 to GW 111;
- HDMI connection 1101, connecting MSD 113 to DTV 112.

Local network devices 112, 113, 117 and 119 use their local network connection to the gateway 111 to get access to the Internet. Many devices in the local network, such as devices MSD 113, DPC 119 and LPC 117 incorporate data storage. The total amount of data stored devices in the home network can be important. A typical local network such as a home network comprises devices that store photos, movies, and music. The data stored on the devices is voluminous and precious for its users but no efficient safekeeping against data loss is undertaken. Data backup is unorganized because it is slow and cumbersome to set up; at best, data is copied on CD's or DVDs or external storage devices including a storage server 118 on the Internet on an individual, per user and per device basis. There is no systematic, organized and well managed data backup that ensures sufficient protection against data loss.

The invention proposes a solution for securing data stored on the devices connected to the local network in a satisfying manner.

To illustrate the invention, we consider that for a subscriber to an ADSL access service for connection to the Internet, such as the members of a family living in premises 110, upload bandwidth is limited. Uploading large amounts of data such as photos, videos etc is therefore time-consuming.

In professional environments such as enterprise networks, backup techniques exist that for example create a weekly full backup archive. At the end of each next day a "delta" backup is stored on the server, the delta comprising the differences between the full backup and the daily backup, or comprising the differences between the daily backup of the previous day and the daily backup of the current day. This process is then repeated every week. The method is efficient because the professional network can be used to transfer voluminous data in a short time, for example from a user PC to a data backup server. However, this method is not suited when voluminous data must be transferred over a slow connection, i.e. when the time needed for the transfer of the weekly backup would take for example more than one day, e.g. 4 days. During the time needed for completion of the full backup, daily backups are not done. Then, data lost during this period of time that it takes to transfer the weekly backup cannot be restored. As a typical example a size of data to backup ('data archive') is 5 Gbytes. This size is not uncommon, considering that a 1 hour HD (High Definition) video with a streaming bit rate of 10 Mb/s would take more than 36 GB. With a mean uplink bandwidth of 128 kb/s, which is typical for a standard ADSL connection (ADSL offers upload bitrates up to 448 Kbps in ideal circumstances; ADSL2+ allows upload bitrates up to 1.4 Mbs under ideal circumstances). With for example 75% reserved for uploading the data archive, uploading this amount of data would take 4 days, 19 hours and 45 minutes (i.e. calculated in seconds: $(5.10^9 \times 8 \text{ bits})/(\frac{3}{4} \times 28.10^3)$). Ensuring the daily backups with this data archive size and such upload bandwidth is thus clearly not possible. Data in the local network that is modified after the moment the upload of the archive is started cannot be retrieved when lost; this is because, only when the full backup is done, a new backup can start.

The invention provides a solution to this problem. The invention comprises a method that allows simultaneous and automatic data transfer that can be used for example to transfer a weekly full backup and daily backups, so that data backup is better ensured.

In local networks such as a home network, a central role is distributed to the gateway. The gateway interconnects the home network devices and has a high availability, because it remains powered on most of the time. Inside the home network, data transmission speed is high, e.g. 100 Mbit/s or higher over wired connections. The home gateway can thus be used to discharge the home network devices from self-uploading of backup data, if it provides caching for uploading voluminous data from home network devices to storage in the external network.

The invention comprises a method of data transfer that is particularly efficient for the transfer of voluminous data to network storage over a communication link with low upload capacity. In particular, when applied to transfer of backup data, the method of the invention ensures that lost data can be retrieved for a predefined time period, for example on a daily basis, through a unique combination of local caching, automatic and simultaneous upload of full- and partial backups (e.g. full: weekly, partial: daily), management of data persistence and adaptability to the upload capacity of the communication link.

Figure 2:
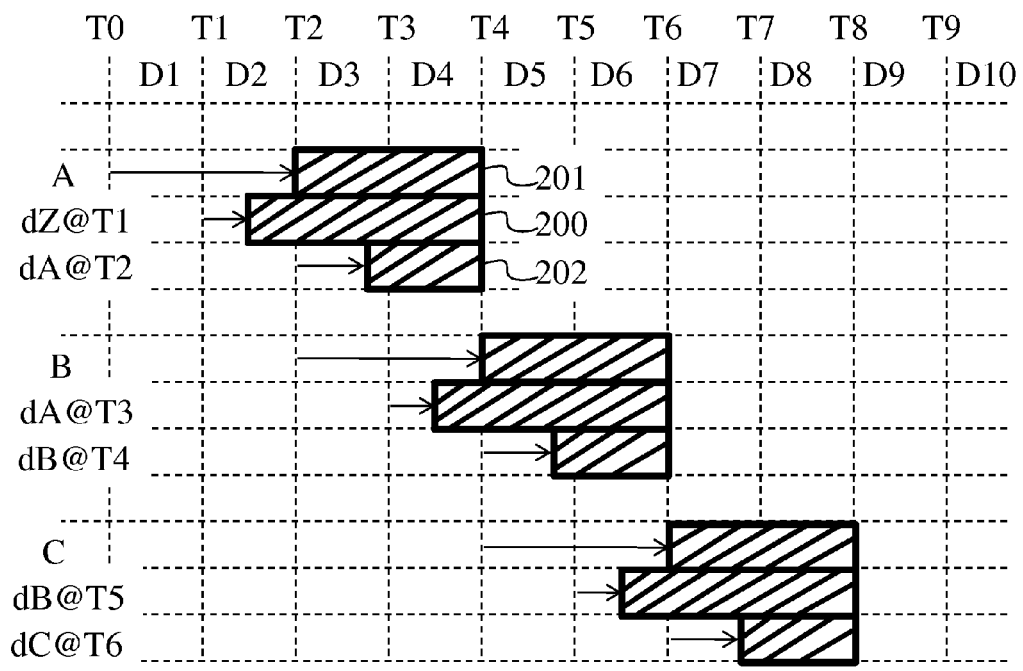
FIG. 2 illustrates data upload from a first network to a second network, implemented for example by GW 111 from FIG. 1.

FIG. 2 illustrates data transfer from a first network to a second network according to the method of the invention, implemented for example by GW 111 from FIG. 1. For reasons of keeping the illustration comprehensible, it is assumed here that a full backup is done every two days, i.e. which corresponds according to this example to the time needed to upload the full backup due to the bottleneck formed by the transmission upload speed and the upload communication link bandwidth availability. If the upload bandwidth is 128 kb/s, with 75% availability for uploading of data archive, a full backup can comprise up to 2 GB of data.

In FIG. 2, T0-T9 represent moments in time. D1-D10 represent days. The letter 'A' represents backup data, e.g. a two-day full archive built for example from data stored by the devices in the home network and constituted on the GW 111 at T0. Besides full archives, that take several days to upload, delta archives are constituted on the gateway that take lesser than one day to upload. A delta archive relates to differences with a full archive that is already uploaded to the second network. 'dZ@T1' represents a daily archive, including any differences ('d' for 'delta' and '@' for 'at') between a previous uploaded full archive Z (not shown) and modifications of data in the home network devices with regard to archive Z at the end of day 1. 'dA@T2' represents a second daily archive that includes any differences between full archive A that is completely uploaded to the second network at the end of day 2. Similarly, B represents a new 2-day full archive, built at the end of day 2. dA@T3 and dB@T4 represent daily archives that comprise differences between full archive A respectively B, at respectively the end of day 3 and day 4. Likewise, C represents a new 2-day full archive, built at the end of day 4. dB@T5 and dC@T6 represent daily archives that comprise differences between full archive B respectively C, at respectively the end of day 5 and day 6. Arrows represent uploading from the GW 111 to the second network, represented by for example distant storage server 118 of FIG. 1 that is connected to the Internet. Diagonally hatched boxes represent uploaded data, as uploaded to the distant storage.

Thus, at T0, the devices in the local network have transferred their data to backup to the gateway, which gateway constitutes an archive 'A' from this data. The transfer of this full backup from the gateway to the distant storage is started at T0. As the transfer takes two days, the archive is completely uploaded to the distant storage at T2. During this upload of archive A, at T1, a delta backup (dZ@T1) is constituted on the GW that comprises the differences between a previously uploaded full archive Z (not shown) and the data to backup from the local network devices at T1, i.e. one day after the transfer of archive A to the distant storage was started. In other words, the delta dZ@T1 comprises the differences at the end of day D1 with archive Z. At T1, the delta dZ@T1 is transmitted to the distant storage, i.e. in parallel, or simultaneously, with the still ongoing transmission of archive A. This delta is completely transmitted to the distant storage somewhere between T1 and T2, (hatched box 200). At T2, i.e. at the end of D2, the transfer of another delta (dA@T2) to the distant storage is started. This delta is completely uploaded to the distant storage somewhere in between T2 and T3. Thus, distant storage now comprises delta dZ@T1, archive A and its delta dA@T2.

Concretely, this means that:
  from the moment that A is uploaded to the distant storage, i.e. at T2, any data up to T0 that is lost in the local network can be restored from A; e.g. either restored from the gateway (if archive A is not yet destroyed) or retrieved from the distant storage;
  from the moment that A and dA@T2 are uploaded to the distant storage, i.e. between T1 and T2, any data up to T0 or up to T2 that is lost in the local network can be restored from A (data modifications up to T0) or from A+dA@T2 (modifications to the data up to T2).

At T2, a new full archive B is constituted on the GW, comprising the modifications of data in the local network up to T2. As soon as this archive is uploaded to the distant storage, i.e. at T4, archives A and deltas dZ@T1 and dA@T2 can be removed from the distant storage, because B represents the latest state of the data in the local network, i.e. at T2, which is double with A+dA@T2. Then, upload of deltas dA@T3 and dB@T4 follow, in the same way as described previously for archive A and deltas dZ@T1 and dA@T2. Idem, at T4 the transfer of an archive C is started, at T5 the transfer of a delta dB@T5 is started, and at T6 the transfer of a delta dC@T6 is started.

According to a variant embodiment of the invention, the already stored archives and their deltas are not deleted from the distant storage when more recent archives and deltas arrive, which has the advantage to be able to offer a great flexibility in restoring data for users of the devices of the local network, i.e. the state of data in the local network can be restored on a daily basis as the data remains stored on the distant storage; e.g. for the example of FIG. 2, if all archives Z, A, B, C and their deltas remain stored on the distant storage, the storage system is capable at T7 of restoring the state of the data in the local network as it was at T0, T1, T2, T3, T4, T5, or T6. When data is fully uploaded to the distant storage, it is no longer needed to keep the data on the gateway any longer than the gateway needs an archive to generate delta archives. For example, when dA@T3 is completely uploaded to the distant storage, i.e. somewhere between T3 and T4, no more delta archives will be created for full backup archive A, and the data is secured on the distant storage; thus, files related to archive A, i.e. A and the delta dA@T2 and dA@T3 can be removed from the gateway, which advantageously results in freeing of storage space on the gateway.

In FIG. 2, the delay needed to transfer the different archives A, B, C and their delta archives is represented as being the same for each archive A, B, C, and the different deltas. This is done for reasons of simplicity of presentation. In practice, the delay is variable and depends on available upload bandwidth and archive size. In general, upload delay will however be shorter for a delta than for a full backup, due to the difference in archive size. Also, during the simultaneous upload of full- and delta backup archives according to the method the uplink is shared by the simultaneous uploads. This can be taken into account, i.e. when calculating the final upload bitrates and resulting time needed to upload archives and their deltas.

The distant storage as discussed can be of different types, such as a backup storage offered by an Internet provider, or a dedicated storage server or set of storage servers of an enterprise, located in a geographically different place via a WAN (Wide Area Network).

As mentioned, the delay needed to transmit data to the external (Internet) storage depends on the size of the data as well as on the upload capacity of the communication link to the external storage. According to the method of the invention, the data transmission time of the full backup is taken into account, so that the method of the invention is adapted to, for example, a full backup that takes 2 days to transmit, or 3, 4, 5 or even 10 days or more. According to the method of the invention, the number of daily archives is adapted to the time needed for transfer of the full backup to the distant storage. This is advantageous, considering that the full backup may be sized large or small according to the amount of data to transfer, and that the upload bandwidth may vary according to the usage of the connection 1000 for other purposes than for data backup, which other use may be considered having a higher priority according to data traffic rules that are for example established by a network manager.

Figure 3:
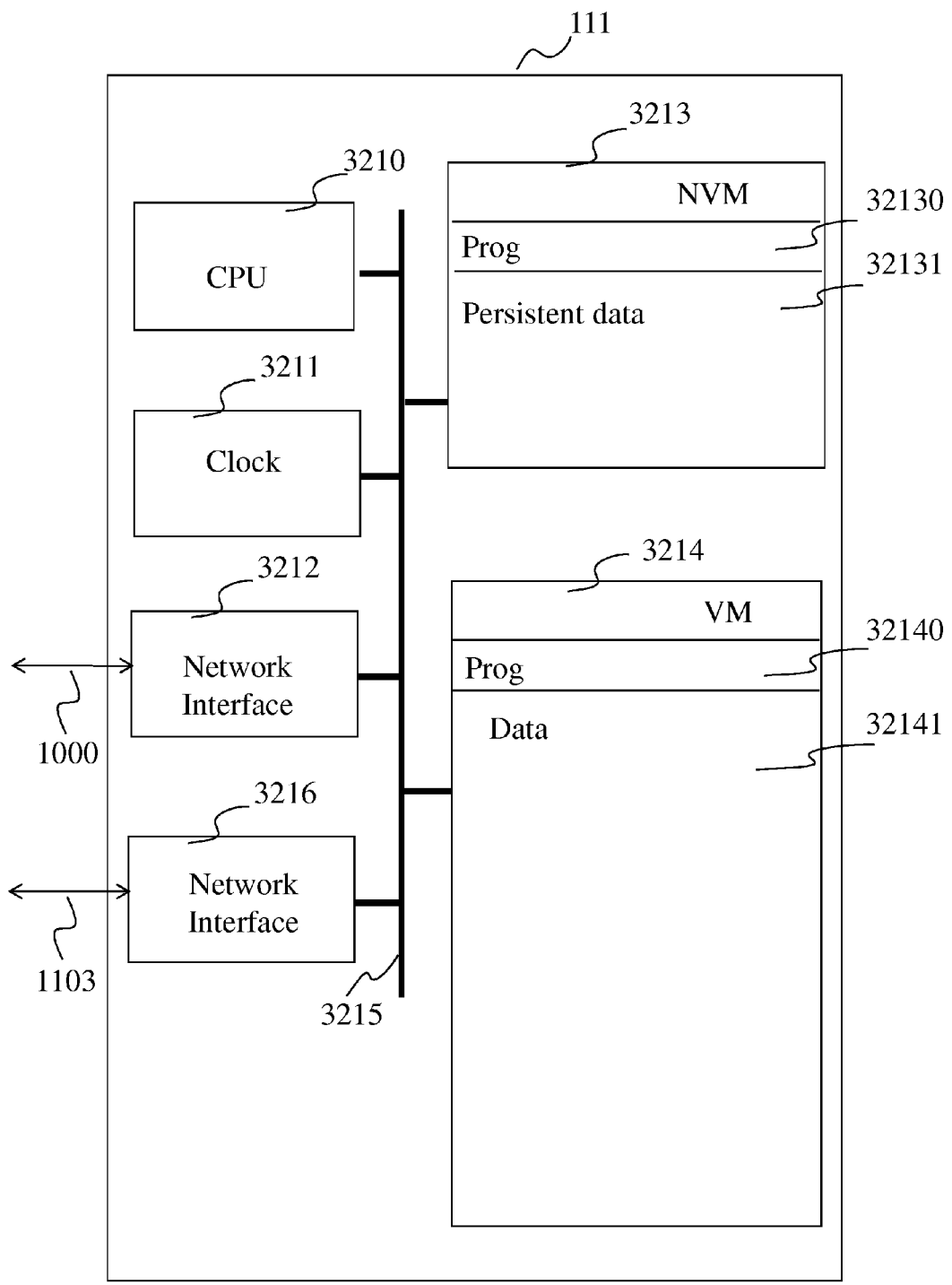
FIG. 3 shows an implementation of a device suited for implementing the invention and its different variant embodiments.

FIG. 3 shows an implementation of a device suited implementing the invention and its different variant embodiments, such as GW 111 of FIG. 1.

The GW 111 comprises the following elements:
a central processing unit 3210 or CPU;
a clock unit 3211;
a first network interface 3212;
a second network interface 3216;
a non-volatile memory NVM 3213; and
a volatile memory VM 3214.

Processing unit 3210 can be implemented as a microprocessor, a custom chip, a dedicated (micro-) controller, and so on. Non-volatile memory NVM 3213 can be implemented in any form of non-volatile memory, such as a hard disk, non-volatile random-access memory, EPROM (Erasable Programmable ROM), and so on.

The non-volatile memory NVM 3213 comprises notably a register 32130 that holds a program representing an executable program comprising the method of data transfer according to the invention and a register 32131 comprising persistent parameters. When powered up, the processing unit 3210 loads the instructions comprised in NVM register 32130, copies them to VM register 32140, and executes them.

The VM memory 3214 comprises notably:
a register 32140 comprising a copy of the program 'prog' of NVM register 32130;
a data storage 32141, used for storing of variables, parameters and other data needed during the execution of the programme in register 32140.

Figure 4:
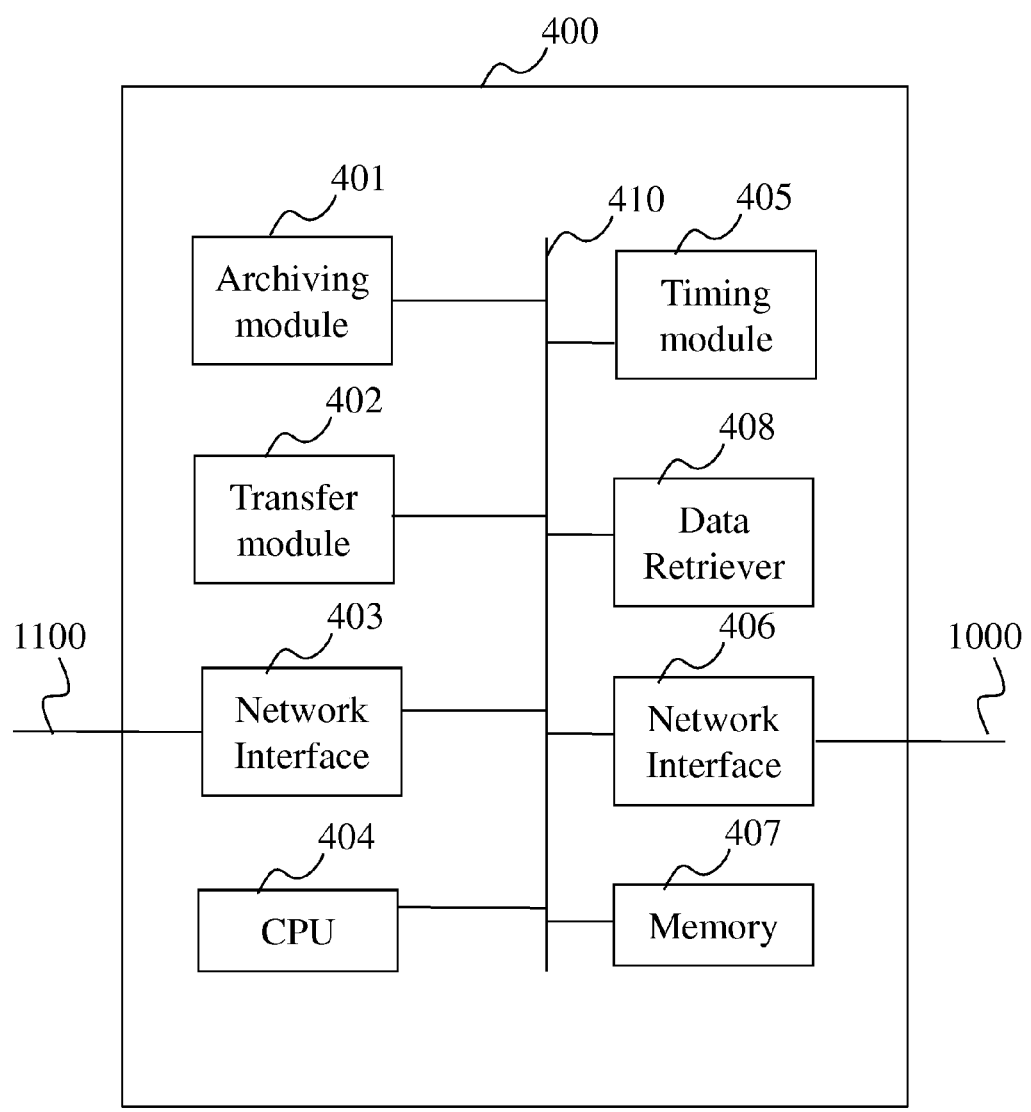
FIG. 4 depicts an alternative embodiment of a device suited for implementing the method of the invention and its different variant embodiments.

FIG. 4 depicts an alternative embodiment of a device suitable for implementing the method of the invention and its different variant embodiments. The device 400 comprises:
a retriever module (408) for retrieving data stored in the first network;
an archiving module (401) for archiving data stored in the first network into an archive;
a transfer module (402) for transferring of data archived by the archiving module to a storage provided in a second network;
a timing module (405) for determining of expiration of a predetermined first delay and a predetermined second delay;
the device simultaneously transferring at least one full archive and at least one differential archive archived by the archiving module, the full archive comprising data retrieved from the first network with the retriever module, and the differential archive comprising differences in data retrieved from the first network that relate to data comprised in a latest completely transferred full archive with the transfer module;
the transferring by the transfer module of the at least one full data archive being triggered by the timing module upon expiration of the predetermined first delay, and the transferring by the transfer module of the at least one differential archive being triggered by the timing module upon expiration of the predetermined second delay, the predetermined first delay being longer than the predetermined second delay.

According to a variant embodiment, the invention is entirely implemented in hardware, for example as a dedicated component (for example as an ASIC, FPGA or VLSI) (respectively <<Application Specific Integrated Circuit>>, <<Field-Programmable Gate Array>> and <<Very Large Scale Integration>>) or as distinct electronic components integrated in a device or in a form of a mix of hardware and software.

Figure 5:
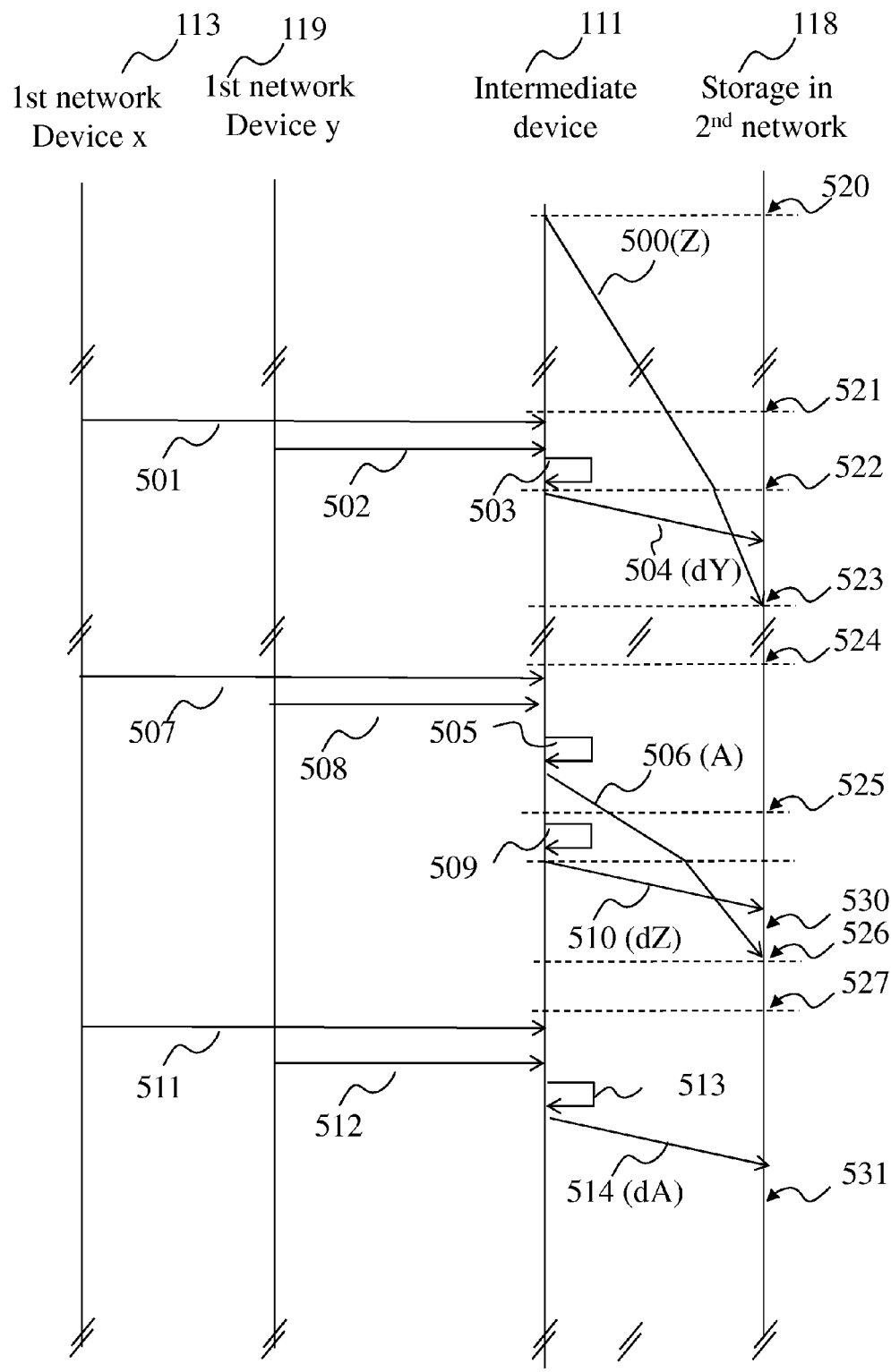
FIG. 5 illustrates the method of the invention in sequence-chart form according to a specific and non-limited embodiment.

FIG. 5 illustrates a particular, non-limiting, example implementation of the method of the invention in sequence-chart form.

Double forward slashes ("//") represent a time discontinuity. In this example, it is supposed that data retrieved from the first network is converted in to an archive before transmission of the archive to the storage in the second network. This data transfer from devices 113, 117 and 119 connected to the first network 1100 to the intermediate device 111 can be operated in push or pull mode, i.e. either the data is retrieved from the first network devices at the intermediate device at the initiative of the intermediate device (pull mode), or retrieved at the intermediate device at the initiative of the first network devices (push mode). Data archives comprises data in a compressed format, that allows to considerably reduce the size of the data with regard to its uncompressed form, so that storage of the data and transfer allow to reduce storage resources and network resources for its transport. In this figure, Y, Z, A and B correspond to different archives. dY, dZ and dA correspond to differential archives or "delta" archives, constructed from differences in data retrieved from the first network that relate to "full" archive Y, respectively to Z and A. As a further example, it is assumed that a transfer of each of the full archives Y, Z, A and B from the intermediate device to the storage in the second network takes less than 7 days, which is suitable for weekly archiving of a full backup, and that the transfer of each delta archive takes less than one day, which is suitable for a daily archiving of differences with the last complete transferred full backup. In the following, the delay for triggering a full backup (e.g. each 168 hours, corresponding to 7 days) will be referred to as 'first predetermined delay', whereas a delay to trigger a differential backup (e.g. each 24 hours) will be referred to as 'second predetermined delay'. During the time that it takes to transfer a full archive, several delta archives are transferred. These delta archives represent differences of data in the first network with the last complete transferred full archive. Thus, one or more delta archives are transferred during a transfer of a full archive, and the second delay is thus set to a shorter time than the first delay. Whereas the first predetermined delay is restarted upon a start of transfer of a full archive, the second predetermined delay is restarted upon a start of transfer of a delta archive. So, according to the previous example, 7 differential backups dZ are transferred during the time it takes to transfer the full backup A. That the differential archives that are transferred during transfer of a full archive relate to the last completely transferred full archive, is understandable when one considers what happens if something goes wrong in the first network and how data that corresponds to the latest backup can be retrieved from the storage in the second network. This will be explained further on after the detailed explanation of the flow chart. In FIG. 5, the data retrieved by the intermediate device 111 originates from first network devices 113 and 119. Of course, data can be retrieved from any of the first network devices. Also, the method of the invention can take into account changes in the network topology of the first network that may occur during execution of the method, some first network devices may disconnect while others (re-) connect.

In a first step 500, a data archive Z is transferred from the intermediate device 111 to the second network for storage by the storage device 118. At step 501 and 502, data is retrieved from the first network. In step 503 and at T=521, the second predetermined delay expires (e.g. a delay of 24 hours for triggering of a daily backup) and an update data transfer is triggered. Upon expiry of this delay, the intermediate device creates a differential archive dY (operation 503) from the latest data retrieved from the first network, which comprises the differences between this latest data with the last completely transferred full archive (Y) (NB the transfer of archive Y is not shown in the figure). In a step 504, this differential archive dY is transferred to the second network. During this time, transfer of the next full archive after Y, i.e. Z, is still ongoing. Archive Z is completely transferred at T=523. Thus, during T=522 until T=523, both transfers take place at a same time, which slows down the ongoing transfer of the full archive Z, which is therefore depicted by a broken arrow 500.

When the predetermined first delay expires at T=524 (e.g. 7 days after the start of transfer of full archive Z; e.g. the delay between T=520 and T=524), transfer of a next full archive A is triggered. This full archive comprises the latest state of the data in the network which corresponds to the data retrieved in steps 507 and 508. A new full archive A is constituted on the intermediate device in step 505 from this latest data retrieved. The full archive A is transferred in a step 506. At T=525, the second predetermined delay expires again and a new archive to transfer is constituted by the intermediate device in a step 509. Again, this new archive comprises the differences between the latest data retrieved from the first network (i.e. retrieved in steps 507 and 508) and the last full archive that was completely transferred to the second network (e.g. dZ, because the transfer of A is still ongoing at the moment of the trigger). At T=526, the transfer of the full archive A is terminated. Before the moment that the first predetermined delay expires, the first predetermined delay expires once more at T=527. A new archive is constituted on the intermediate device in a step 513 that comprises the differences between the latest data retrieved from the first network (i.e. 511, 512) and the last fully transferred full archive, i.e. dA. This delta is transferred to the second network, indicated by arrow 514.

For calculating the predetermined first and second delays, different parameters can be taken into account, such as estimated available upload bandwidth and archive sizes.

If, following a trigger related to expiry of a predetermined second delay, the calculation of differences (delta) results in no difference found, the delta transfer is not done since there is no delta to transfer.

Care is to be taken for deletion of 'old' archives when they are transferred to the second network. If backup policy is to not allow further going back in time than one predetermined first period (e.g. a week), a full archive should only be deleted from the storage in the second network if it is replaced by a more recent full archive. This is more easily understood when considering what happens when a failure occurs in the first network and data must be restored from the archives saved in the second network. Suppose that data loss occurs at T=530. At that moment, the most recent data stored is represented by archive Z, and delta archive dZ, because at T=530, archive A is still not fully transferred to the second network.

Instead of implementing the invention on an intermediate device as described, the invention can also be implemented as a proxy application that is installed on any of the first network devices that has a connection to the second network. Advantageously, the proxy application is installed on a device such as a home gateway that has a connection to both the first network and the second network and that remains powered on most of the time so that the proxy application is available for the first network devices. Alternatively, as devices of the first network power down or disconnect from the first network, the proxy application is moved to or made active on a device of the first network that is the last device in the first network that has a connection to the second network and that remains powered on or that remains connected to the first network (i.e., a roaming proxy application).

The invention claimed is:

1. A data backup method, wherein the method is implemented by an intermediate device connecting first devices connected in a first network to a backup data storage server connected in a second network, comprising:
   upon expiration of a first predetermined delay, first uploading, from the intermediate device to the backup data storage server, of a full backup archive built by the intermediate device from data stored by the first devices;
   during the first uploading and upon expiration of a second predetermined delay that is shorter than the first predetermined delay, second uploading from the intermediate device to the backup data storage server, of at least one differential backup archive built by the intermediate device from data stored by the first devices, wherein each of the at least one differential backup archive that is uploaded in the second uploading is differential with regard to a latest completely uploaded full backup archive that is uploaded during the first uploading; and
   the predetermined first delay and the predetermined second delay being determined as a function of a bit rate of an uplink connecting the intermediate device to a storage in the second network and as a function of a size of the at least one full backup archive and of the at least one differential backup archive.

2. The method according to claim 1, wherein an uploaded full backup archive is only deleted from the backup data storage server when a full backup archive with a newer version is completely uploaded to the storage.

3. The method according to claim 1, wherein the first network is a local area network and the second network is the Internet.

4. The method according to claim 1, wherein the intermediate device is a gateway, giving the first devices connected in the first network access to the second network.

5. A device for backup of data stored by first devices connected in a first network to a backup data storage server connected in a second network, the device comprising:
   a processor, a memory, a clock unit and at least one network interface, wherein the processor, the memory, the clock unit and the at least one network interface are configured to:
   build a full backup archive from data stored by the first devices and for building of at least one differential backup archive from data stored by the first devices;
   determine expiration of a first predetermined delay and of a second predetermined delay, the second predetermined delay being shorter than the first predetermined delay;
   first upload to the backup data storage server, upon expiration of the first predetermined delay, of a full backup archive;
   upload to the backup data storage server, during the first upload and upon expiration of the second predetermined delay, at least one differential backup archive, wherein each of the at least one differential backup archive that is uploaded is differential with regard to a latest completely uploaded full backup archive that is uploaded during the first upload; and determine the first delay and the second delay as a function of a bit rate of an uplink connecting the intermediate device to a storage in the second network and as a function of a size of the at least one full backup archive and of the at least one differential backup archive.

6. The device according to claim 5, wherein the processor, the memory, the clock unit and the at least one network interface are configured to delete an uploaded full backup archive from the backup data storage server when a full backup archive with a newer version is completely uploaded to the storage.

7. The device according to claim 5, wherein the first network is a local area network and the second network is an Internet network.

8. The device according to claim 5, wherein the intermediate device is a gateway giving the first devices connected in the first network access to the second network.

* * * * *